United States Patent [19]
Caplin

[11] Patent Number: 5,823,476
[45] Date of Patent: Oct. 20, 1998

[54] DEVICE AND METHOD FOR EQUALIZING HEAT DISSIPATION BETWEEN MULTIPLE RADIATORS ON A SPACECRAFT

[75] Inventor: Glenn N. Caplin, Manhattan Beach, Calif.

[73] Assignee: Hughes Electronics Corporation, Los Angeles, Calif.

[21] Appl. No.: 577,443

[22] Filed: Dec. 22, 1995

[51] Int. Cl.$^6$ .................................................. B64G 1/46
[52] U.S. Cl. ....................... 244/158 R; 165/274; 244/163
[58] Field of Search ................................ 244/158 R, 163, 244/57; 165/274, 269, 291, 300; 361/676, 677, 678, 688, 689, 690, 699, 701, 702, 703, 704, 707, 714; 307/86, 87

[56] References Cited

U.S. PATENT DOCUMENTS

| | | | |
|---|---|---|---|
| 3,842,249 | 10/1974 | Gayer et al. | 307/86 |
| 4,141,497 | 2/1979 | Valbjorn et al. | 165/274 |
| 4,388,964 | 6/1983 | Almgren et al. | 165/274 |
| 4,420,035 | 12/1983 | Hewitt . | |
| 5,142,163 | 8/1992 | Hase | 307/87 |
| 5,267,605 | 12/1993 | Doty et al. | 244/163 |
| 5,332,030 | 7/1994 | Spencer et al. . | |

FOREIGN PATENT DOCUMENTS

| | | |
|---|---|---|
| 0687627 | 12/1995 | European Pat. Off. . |
| 2463058 | 2/1981 | France . |

*Primary Examiner*—Glenn L. Barefoot
*Attorney, Agent, or Firm*—Terje Gudmestad; M. W. Sales

[57] ABSTRACT

Device and method for more equally distributing heat dissipation between multiple radiators of a satellite. The device includes radiator panels mounted on the satellite, power sources mounted on some or all of the radiator panels, and loads capable of inhibiting current from adjacent power sources and accepting current only from nonadjacent power sources.

14 Claims, 2 Drawing Sheets

DEVICE AND METHOD FOR EQUALIZING HEAT DISSIPATION BETWEEN MULTIPLE RADIATORS ON A SPACECRAFT

BACKGROUND OF THE INVENTION

A satellite is a type of spacecraft that orbits either the earth or another body of the solar system. There are two main classes of satellites: information satellites and communications satellites. Information satellites transmit signals related to atmospheric and meteorological data, infrared, ultraviolet, gamma and X-ray studies of celestial objects, and surveys of the earth's shape, surface, and resources. Communications satellites receive radio frequency signals from earth by means of highly directional aerials and return them to another earth location for purposes such as long-distance telephony and television broadcasting.

A satellite typically includes a payload module and a platform module. For a communications satellite, the payload is the communications equipment necessary to perform the mission. The platform typically includes the following subsystems: (1) power; (2) attitude determination and control; (3) propulsion; (4) on-board telemetry tracking and command (TTC); (5) thermal control; and (6) structure. These subsystems play a vital role throughout the satellite's operational life.

The thermal control subsystem achieves temperature balance and proper performance of all subsystems. Electronic components utilized throughout the various subsystems experience thermal stress resulting from high temperature effects from the sun, from low temperatures occurring during eclipse, and from heat dissipated internally by components located aboard the satellite. Thermal devices, such as radiators, are commonly used to dissipate excess heat and to protect the electronic equipment from thermal stress. Radiators used on satellites typically include sheets of a highly thermally conductive material with a high thermal emissibility characteristic. To provide maximum heat radiation to space, high power dissipation components are commonly mounted directly to the radiator panels.

The radiators are generally mounted to the North and South sides of the spacecraft because these surfaces receive a constant solar input on a daily basis which varies only seasonally. The capability of the radiator to dissipate heat to space is a function of the area of the radiator. The radiator area is constrained by the spacecraft configuration and rocket fairing (the nosecone of the rocket that encapsulates the spacecraft and protects it from aerodynamic loads during the launch ascent through the atmosphere). Consequently, each radiator is constrained in area and thermal dissipation capability. Maximum total spacecraft dissipation is achieved when all radiators are operating at their maximum dissipation capability. Currently, maximum dissipation cannot be achieved because the dissipation of a particular radiator panel depends on the complement of equipment mounted thereon that is in the "on" position, and this complement is generally not the same for both radiators. As a result, the radiator has to be designed for the "worst case" complement of equipment turned "on" and "off". Hence, the radiators are designed to accommodate relatively high dissipations on one radiator and relatively low dissipations on the other radiator, thereby preventing the spacecraft from achieving total maximum dissipation.

Accordingly, there is a need for a method of equalizing the dissipation of heat between the radiator panels of a satellite regardless of the on/off status of equipment mounted thereon. Such a method would prevent overheating of the radiator panels and resulting component stress, while most efficiently using the available radiator area and fairing volume.

SUMMARY OF THE INVENTION

The present invention provides a device and method which can be implemented in the thermal control subsystem of a satellite. Specifically, the device and method of the present invention are capable of more equally distributing heat dissipation between multiple radiators on a satellite. In a first preferred embodiment, the device includes radiator panels that form exterior surfaces of the satellite, power sources mounted on some or all of the radiator panels, and a load capable of inhibiting current from adjacent power sources and accepting current only from nonadjacent power sources.

In a second preferred embodiment, the load does not prevent adjacent power supplies from providing current, but rather controls the amount of power supplied by all power sources in a manner that equalizes the thermal dissipation of the radiator panels.

The device and method of the present invention provides several benefits to the thermal design of a satellite. There is no longer a need to oversize the radiator panel in order to accommodate simultaneous dissipation of heat from a load and an adjacent power source without overheating the radiator panel. More radiator area is available for revenue generating payload units such as solid state power amplifiers (SSPAs) and traveling wave tube (TWT) amplifiers. These amplifiers are used to amplify low level radio frequency (RF) signals received from earth for retransmission to earth. In addition, because heat dissipation is equalized among the radiator panels, all units experience a more stable thermal environment. More particularly, the maximum temperatures and temperature variations that the units are subject to are reduced, which results in simplified design and construction of the units, and increased reliability and life.

The invention itself, together with further objects and attendant advantages, will be understood by reference to the following detailed description, taken in conjunction with the accompanying drawings.

DETAILED DESCRIPTION OF THE DRAWINGS

Figure 1:
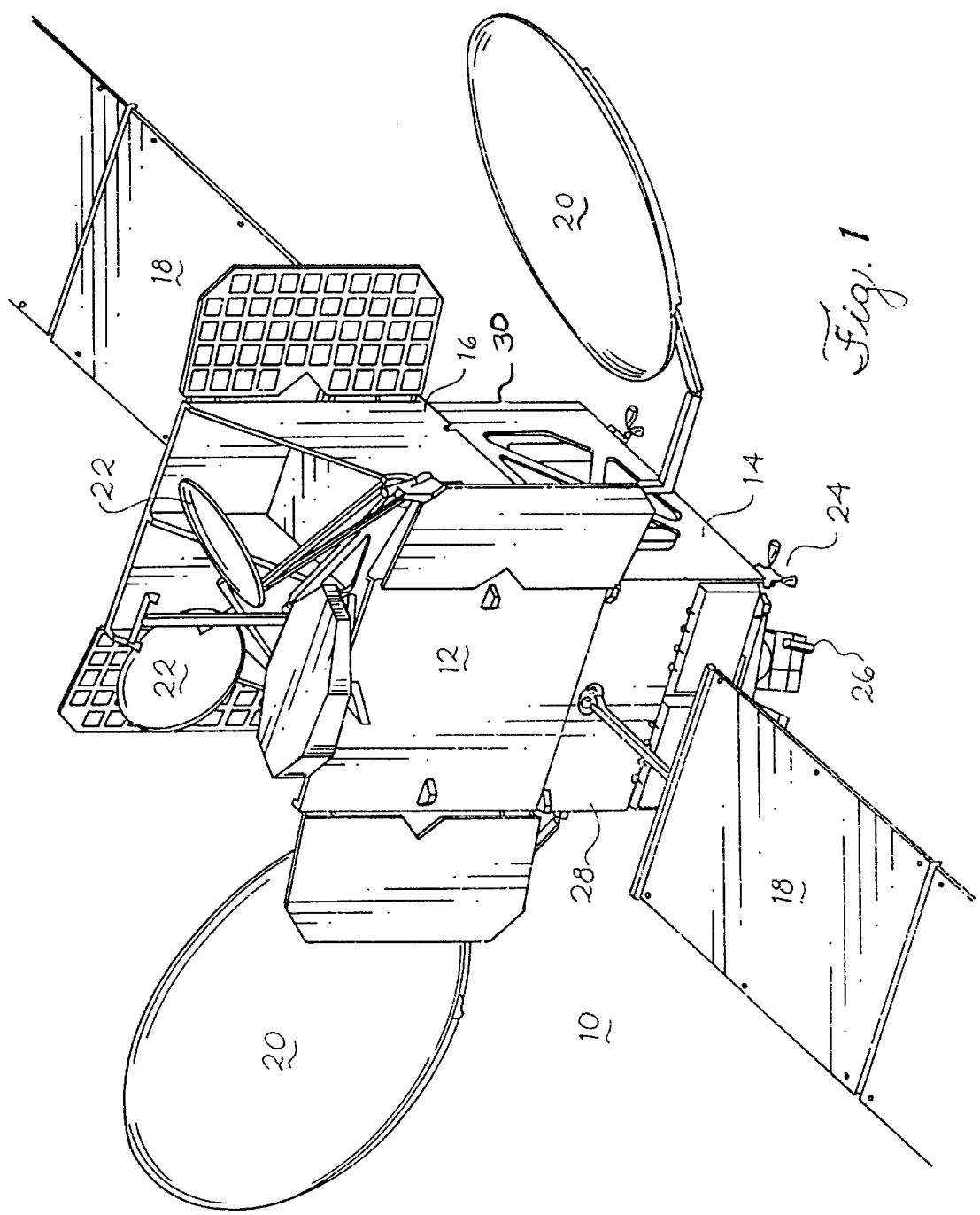
FIG. 1 is a diagram of a satellite capable of utilizing the present invention.

A spacecraft or satellite 10 capable of utilizing the present invention is shown in FIG. 1. The satellite 10 has a spacecraft body 12 which includes a lower bus module or platform 14 and an upper payload module 16. Attached to the aft end of the lower bus module 14 are a plurality of engines. These engines include a centrally positioned liquid orbital thruster (not shown), chemical propulsion engines 24 located at the corners of the bus module 14 and two pairs of xenon ion propulsion engines 26 (one pair shown). Lower bus module 14 contains fuel tanks (not shown) and various power and control modules that operate the engines and power the payload module 16. Bus module 14 further includes a pair of solar panels 18 that convert sunlight into electricity. The electricity is sent to batteries (not shown) located on the bus module 14. Bus module 14 also has a pair of antennae 20, which receive signals from an earth ground station. The antennae 20 reflect the received signals into reflectors 22, which in turn, reflect the signals into receivers (not shown). The antennae 20 are used to control the satellite 10 and to send signals to the ground station.

Payload module 16 is attached to the bus module 14 and contains a variety of electronic equipment which may contain a number of sensors (not shown). The electronic equipment processes information gathered by the sensors and sends the processed information back to the ground station via antennae 20. The gathered information may concern for example, communications, weather observation, and navigational information.

Figure 2:
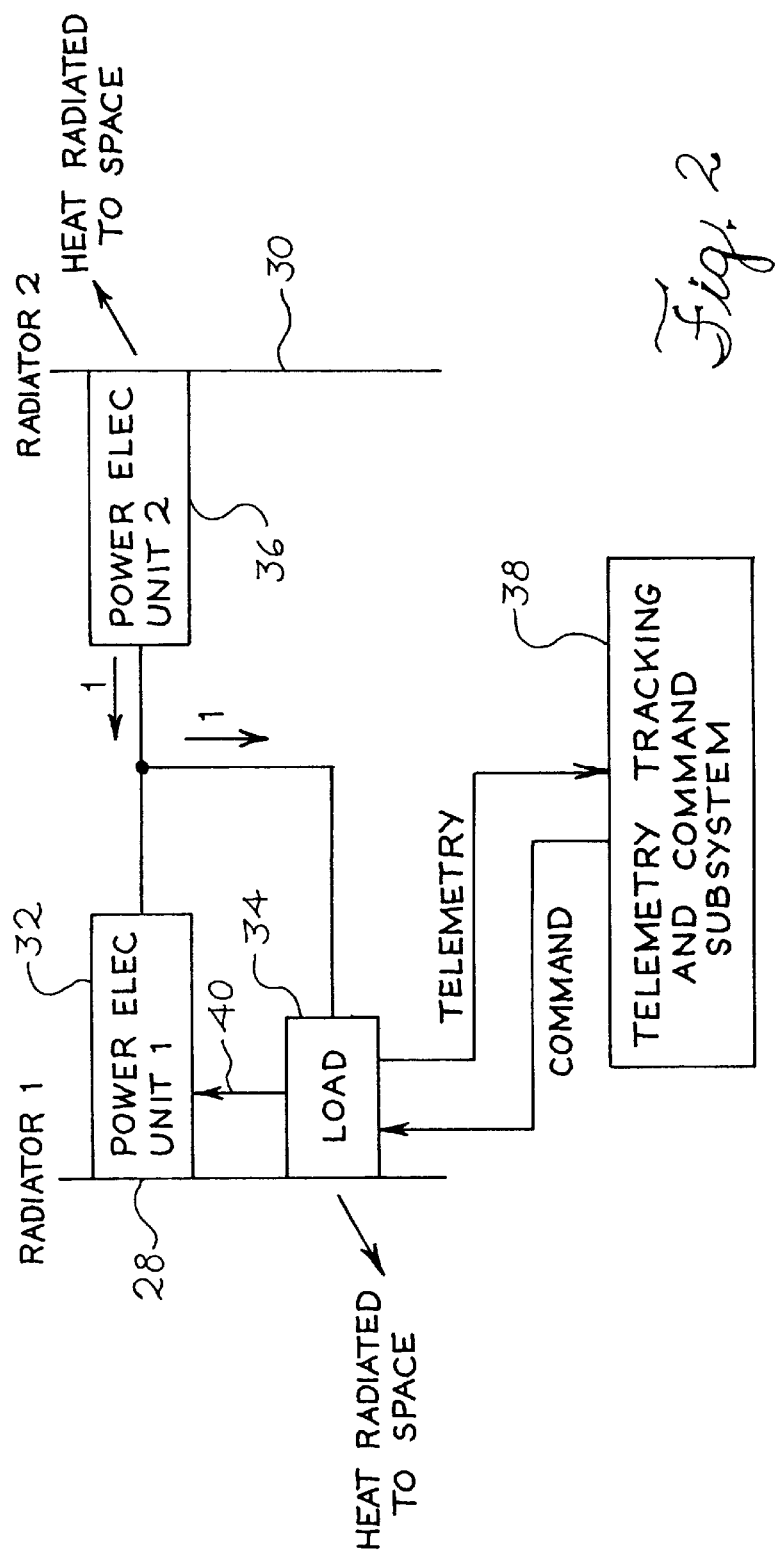
FIG. 2 is a schematic illustration of a preferred configuration for equalizing the dissipation of heat generated by units mounted on the radiator panels of a satellite.

FIG. 2 illustrates a preferred configuration for equalizing the dissipation of heat generated by units mounted on the radiator panels of the satellite of FIG. 1. In the presently preferred embodiment, a first power electronic unit (PEU) 32 and a load 34 is mounted on the first radiator panel 28. The load 34 can be any device on board the satellite that absorbs power and dissipates heat. The PEU 32 can be any device that supplies current to a load. A second PEU 36 is mounted on the second radiator panel 30. For purposes of discussion, the PEUs 32, 36 are integrated power controllers (IPCs) and the load 34 is a xenon ion propulsion system power controller (XPC). The function of the IPC 32, 36 is to condition power on the satellite 10. Specifically, the IPC 32, 36 receives power from the solar panels 18 (FIG. 1) and the battery (not shown), regulates the power at the proper voltage and distributes it to the XPC 34 and/or other spacecraft equipment. The XPC 34 conditions the power received from the IPC 32, 36 and distributes it to the xenon ion thrusters (not shown). In the present example, both IPCs 32, 36 communicate with each other to provide approximately half the current to the XPC 34. Because no electronic unit can condition electrical power with 100% efficiency, the IPCs 32,36 will generate heat. Consequently, the XPC 34 and IPCs 32, 36 are mounted directly to the radiators panels 28, 30 to provide a good heat conduction path directly to space.

In a first preferred embodiment, the XPC 34 turns on upon receiving a command from the TTC subsystem 38. (The TTC subsystem 38 allows ground control stations to send commands to carry out various tasks such as configuring loads and turning loads on and off.) The XPC 34 then commands the adjacent IPC 32 to stop providing current to the XPC 34, thereby causing the nonadjacent IPC 36 to provide all the current to the XPC 34. Thus, only the XPC 34 generates heat on the first radiator panel 28 while IPC 36 generates heat on the second radiator panel 30. As a result, heat dissipation is more equally distributed between the radiator panels 28, 30. The first radiator panel 28 absorbs the heat generated by the XPC 34 and radiates it to space. Similarly, the second radiator panel 30 absorbs the heat generated by the second IPC 36 and radiates it to space. In prior heat dissipation methods, the IPC 32 would have provided half the current to the XPC 34 resulting in a larger dissipation on the first radiator panel 28 and a smaller dissipation on the second radiator panel 30.

In a second preferred embodiment, the XPC 34 turns on upon receiving a command from the TTC subsystem 38. However, instead of commanding the adjacent IPC 32 to stop providing current to the XPC 34, the XPC 34 commands the adjacent IPC 32 to provide less current to the XPC 34. The exact amount of current is determined such that heat dissipation is equally distributed between the radiator panels 28, 30. For example, if the XPC 34 is operating such that it dissipates 100 watts, it will command the adjacent IPC 32 to decrease the amount of current it supplies to the XPC 32 by an amount such that the power dissipation of IPC 32 decreases by a corresponding 100 watts.

The device and method of the present invention provides several advantages to the thermal design of a satellite. The device eliminates the need to oversize the radiator panel in order to accommodate simultaneous dissipation of heat from a load and an adjacent power supply. More radiator area is available for revenue generating payload units such as SSPAs and TWT amplifiers. In addition, because heat dissipation is equalized among the radiator panels, all units experience a more stable environment. More particularly, the units are subject to reduced maximum temperatures and temperature variations, which results in simplified design and construction of the units, and their increased reliability and life.

It should be understood that a wide range of changes and modifications can be made to the preferred embodiments described above. For example, referring to FIG. 2, the XPC 34 can directly command the nonadjacent IPC 36 to provide a different amount of current instead of commanding the adjacent IPC 32 to stop providing current or to provide less current. The adjacent IPC 32 will adjust the current it supplies to the XPC 34 based on the amount of current supplied by the nonadjacent IPC 36. It is therefore intended that the foregoing detailed description be regarded as illustrative rather than limiting and that it be understood that it is the following claims, including all equivalents, which are intended to define the scope of this invention.

What is claimed is:

1. A device for distributing thermal dissipation among radiator panels of a satellite comprising:

a plurality of radiator panels mounted on said satellite;

a first component mounted on a first of said plurality of radiator panels such that said first component dissipates heat to said first radiator panel when said first component is in operation;

a second component mounted on a second of said plurality of radiator panels such that said second component dissipates heat to said second radiator panel when said second component is in operation;

at least one load in communication with and controlling the operation of said first and second components, said load selectively controlling the operation of said first and second components in order to achieve a desired level of heat dissipation from said first and second components, thereby controlling the amount of heat that is dissipated to said first and second radiator panels.

2. The device of claim 1 wherein:

said first component comprises a first power source that generates power and heat during its operation; and said second component comprises a second power source that generates power and heat during its operation; and said load selectively controls said first and second power sources based on a desired distribution of selected satellite power requirements between said first and second power sources.

3. The device of claim 2 wherein said load selectively controls said first and second power sources by deactivating said first power supply and activating said second power source.

4. The device of claim 2 wherein said load further selectively controls said first and second power sources to selectively distribute dissipated heat among said first and second radiator panels.

5. A device for distributing thermal dissipation among radiator panels of a satellite comprising:

a plurality of radiator panels mounted on said satellite;

a first component mounted on a first of said plurality of radiator panels such that said first component dissipates heat to said first radiator panel when said first component is in operation;

a second component mounted on a second of said plurality of radiator panels such that said second component dissipates heat to said second radiator panel when said second component is in operation;

at least one load in communication with and controlling the operation of said first and second components, said load having power requirements and selectively controlling the operation of said first and second components to supply said load power requirements, said load power requirements having a total amount of load power heat dissipation associated therewith;

said load selectively controlling the power generated by said first and second components in a manner designed to distribute generation of said load power requirements between said first and second components, said control exerted by said load further designed to selectively distribute the amount of the total load power heat that is dissipated into said first and second radiator panels, respectively.

6. The device of claim 5 wherein:

said load is mounted to said first radiator panel, and said load generates load heat during operation;

said control exerted by said load further designed to consider the amount of load heat dissipated into said first radiator panel when said load control selectively distributes the total load power heat between the first and second radiator panels, respectively.

7. The device of claim 5 wherein said load control comprises deactivating said first component and activating said second component such that said second component supplies all of said load power requirements.

8. The device of claim 5 wherein said load control comprises controlling said first and second component operations such that said first component supplies a first portion of said load power and said second component supplies a second portion of said load power, said first portion comprising less than said second portion.

9. A method of distributing thermal dissipation among radiator panels of a satellite, wherein said satellite includes a first component mounted to a first radiator panel, and a second component mounted to a second radiator panel, the steps comprising:

selectively controlling the operation of said first component, said first component dissipating heat to said first radiator panel when said first component is in operation;

selectively controlling the operation of said second component, said second component dissipating heat to said second radiator panel when said second component is in operation;

wherein said steps of selectively controlling said first component and selectively controlling said second component in done according to a protocol designed to achieve a desired distribution of dissipated heat among said first radiator panel and said second radiator panels.

10. The method of claim 9 wherein:

said first component comprises a first power source that generates power and heat during its operation; and said second component comprises a second power source that generates power and heat during its operation;

said step of selectively controlling said first and second power sources is further based on a desired distribution of power outputs between said first and second power sources.

11. A method of distributing thermal dissipation among radiator panels of a satellite comprising:

mounting a plurality of radiator panels on said satellite;

mounting a first component on a first of said plurality of radiator panels such that said first component dissipates heat to said first radiator panel when said first component is in operation;

mounting a second component on a second of said plurality of radiator panels such that said second component dissipates heat to said second radiator panel when said second component is in operation;

providing at least one load in communication with and controlling the operation of said first and second components, said load having power requirements and selectively controlling the operation of said first and second components to supply said load power requirements, said load power requirements having a total amount of load power heat dissipation associated therewith;

said load capable of selectively controlling the power generated by said first and second components in a manner designed to distribute generation of said load power requirements between said first and second components, said control exerted by said load further designed to selectively distribute the amount of the total load power heat that is dissipated into said first and second radiator panels, respectively.

12. The method of claim 11 further comprising the steps of:

mounting said load to said first radiator panel such that said load dissipates load heat to said first radiator panel during operation of said load;

said control exerted by said load further designed to consider the amount of load heat dissipated into said first radiator panel when said load control selectively distributes the amount of the total load power heat between the first and second radiator panels, respectively.

13. The method of claim 11 wherein said load control comprises deactivating said first component and activating said second component such that said second component supplies all of said load power requirements.

14. The device of claim 11 wherein said load control comprises controlling said first and second component operations such that said first component supplies a first portion of said load power and said second component supplies a second portion of said load power, said first portion comprising less than said second portion.

* * * * *